United States Patent [19]

Tangorra et al.

[11] Patent Number: 4,547,175
[45] Date of Patent: Oct. 15, 1985

[54] TRANSMISSION JOINT

[75] Inventors: Giorgio Tangorra; Edoardo Robecchi; Lino Magnabosco, all of Milan, Italy

[73] Assignee: Industrie Pirelli S.p.A., Milan, Italy

[21] Appl. No.: 570,768

[22] Filed: Jan. 16, 1984

[30] Foreign Application Priority Data

Jan. 14, 1983 [IT] Italy .................. 19097 A/83

[51] Int. Cl.⁴ .................................................. F16D 3/50
[52] U.S. Cl. ........................................ 464/56; 464/106
[58] Field of Search ............... 464/69, 55, 87, 51, 464/147, 106, 150, 904, 905, 56, 92

[56] References Cited

U.S. PATENT DOCUMENTS

| | | | |
|---|---|---|---|
| 854,426 | 5/1907 | Lowry | 464/55 |
| 894,842 | 8/1908 | Lowry | 464/55 |
| 1,403,679 | 1/1922 | Forsyth | 464/55 |
| 1,659,353 | 2/1928 | Dwyer | 464/69 X |
| 3,286,488 | 12/1966 | Anderson, Sr. et al. | 464/56 |
| 3,469,417 | 9/1969 | Wakelin | 464/85 X |
| 3,685,314 | 8/1972 | Flannelly | 464/69 |
| 4,116,018 | 9/1978 | Weible | 464/56 |
| 4,205,539 | 6/1980 | Orain | 464/905 |

Primary Examiner—Stephen Marcus
Assistant Examiner—Leo J. Peters
Attorney, Agent, or Firm—Stevens, Davis, Miller & Mosher

[57] ABSTRACT

An elastic joint for the transmission of motion between a driving shaft and a driven shaft, comprising in effect two tetrahedrons joined together along one edge.

The two tetrahedrons are constituted by eight edges formed by flexible elements resistant to tensile stresses; the furthermost edges and the joining edge are formed of material resistant to compression stresses.

13 Claims, 19 Drawing Figures

TRANSMISSION JOINT

The present invention relates to a joint for the transmission of motion between a driving shaft and a driven shaft, and more particularly to a joint for the transmission of motion between two direct shafts also in a position of mutual non-alignment.

Different joints for the transmission of motion between two shafts are already known. A very well known example is the cardan joint, comprising two forks connected to each other by means of a spider; one fork is connected to the driving shaft, the other fork to the driven shaft. The cardan joint has the drawback of transmitting motion via nonaligned shafts with variations of speed in one turn; in practice, the driven shaft is subjected in one turn to variations of speed on increase and on decrease with respect to the speed of the driving shaft.

In order to overcome the cited drawback, one has recourse, as is known, to a double cardan joint; in practice, each cardan joint is connected to the other through an intermediate shaft that itself suffers the variations of angular speed.

As can be understood, this solution produces the drawback of having the joint constituted by a large number of elements and therefore the drawbacks of being cumbersome and involving high costs.

It should also be noted in general how the cited joints, both the single cardan joint and the double cardan joint, produce the drawback of transmitting excessive mechanical vibrations and noise, and these circumstances are not acceptable when these joints are used, for instance, in the automobile field.

The noise phenomena that can be found in the cited joints depend mainly on the large number of mechanical elements connecting the various parts.

In fact, in one of the many possible solutions, the single cardan joint comprises forks integral with the shafts provided with special pins for the coupling operation turned toward the outside; the forks are then connected to the so-called spider constituted in its turn by a ring divided in two parts. On their whole, the two parts of the ring joined to each other carry the bushings necessary for the coupling with the pins of the forks.

At this point, the pins are to be connected to the forks, theoretically under perfect sizing conditions, but practically, both for possible and unavoidable errors of machining and for wear and tear of the parts, in particular for counterblows or shocks during service, this mechanical coupling can produce clearances not forseen at the beginning with consequent transmission of noise caused by the bumps of one coupling element with respect to the other.

Although in theory permitting the overcoming of all the cited drawbacks, there has to be kept in mind the incapacity both of the single cardan joint and of the double cardan joint to graduate the starting torque or the variations of torque of the driving shaft with regard to the driven shaft. In practice, owing to the rigidity of the elements constituting the cited joint, the stresses deriving from a variation of torque of the driving shaft are immediately transmitted to the driven shaft with the same intensity; consequently, the driven shaft is subjected to sudden counterblows which are, first of all, the cause of the cited noise and, secondly, of such stresses as to increase the eventual starting clearances of the elements forming the coupling, with consequent increase of the noise and shortening of the useful lifetime of the joint.

Other joints that are defined in the art as "resilient couplings" are known; these latter are used in particular in the automobile field and are apt to follow the elastic deformations of the chassis to which they are connected when the motor vehicle is running.

In general, these resilient couplings must accomplish the following tasks:

(a) to allow the connected shafts to undergo the relative inclinations;
(b) to permit small relative parallel movements;
(c) to permit a limited liberty of relative axial movements;
(d) to permit relative rotations of the two shafts on varying of transmitted torque, so as to transmit the sudden load variations from the driving shaft to the driven shaft in an attenuated or gradual way.

According to one example, a resilient coupling is constituted by a polygonal element formed by small rubber blocks, where each polygonal element is provided with bushings at the ends; in this case, the driving shaft and the driven shaft are connected in turn to the bushings inserted in the polygonal rubber elements. This type of coupling and other similar couplings based substantially on the use of elastomeric material are suitable, for instance, to transmit mechanical torques between a driving shaft and a driven shaft, graduating the torques and the variations of torques from the driving shaft with respect to the driven shaft since to each variation of torque of the driving shaft there occurs a compression of the small rubber blocks which abosrb and graduate the variation of torque to be transmitted to the driven shaft.

Unfortunately, the known resilient joints under certain conditions of use can solve only a few of the cited problems.

Then there are further known solutions in which joints of different types are combined. In some cases, for instance in the automobile field, it is arranged to use between the change-speed gear of the car and the back wheels a joint constituted on the whole by a joint of resilient type followed by a double cardan joint.

This very diffused solution is really very complicated, expensive, and is subjected to still further drawbacks.

Among other things, owing to the repeated stresses transmitted throughout the motion, the elastomeric material is subjected to heating, the hysteretic losses are increased, its modulus is changed, and consequently in time said elastomeric material is no longer able to function uniformly.

Thus, all the solutions known up to now are unsatisfactory for one reason or another and therefore the object of the present invention is to provide a joint for the transmission of motion from a driving shaft to a driven shaft that shall be devoid of the cited drawbacks.

The main object of the present invention is the provision of a joint for the transmission of motion from a driving shaft to a driven shaft, characterized in comprising a driving support connected to the driving shaft, a driven support connected to the driven shaft, an intermediate support placed between said driving and driven supports, flexible elements resistant to tensile stresses for the relative coupling between said intermediate support and said driving and driven supports, said flexible elements resistant to tensile stresses placed between the supports being directed respectively according to edges of a first tetrahedron and a second tetrahedron joined to each other along one edge formed by said intermediate support, the furthermost edges of the two tetrahedrons being associated with the driving and driven supports, the ends of the edges of the two tetrahedrons being connected on said supports thorugh a hingetype connection, said furthermost edges being parallel to one another and lying on a plane perpendicular to said edge formed by said intermediate support.

Therefore, the main characteristic of the invention resides in the presence of a resistant structure of the joint formed by the presence of flexible elements resistant to tensile stresses, distributed in the space according to the edges of two tetrahedrons in consequence of the particular arrangement of the furthermost and intermediate supports, forming in their turn edges perpendicular to one another of the two cited tetrahedrons.

Consequently, the two tetrahedrons are completely identified in space by eight edges belonging to the elements resistant to tensile stresses and by three edges identified by the presence of the supports of rigid material to carry on the supporting functions.

In order to explain the transmission of motion between two shafts, one has to imagine tracing out a plane containing the edges of two tetrahedrons lying on the furthermost supports; it is possible to find two opposite lateral parts of the joint with respect to said plane.

The elements resistant to tensile stresses, for instance nylon cords, appear as two branches directly on each opposite part, each branch joining the upper and lower ends of the driving and driven supports.

Considering the configuration shown, every time the driving shaft transmits torque to the driven shaft, the strains transmitted through the joint stress the cords arranged according to one of the two branches of each opposite part of the joint; in practice, the strains in one part of the joint are directed according to a branch comprised between the upper end of the driving support and the lower end of the driven support and vice versa in the other part of the joint.

Since tensile stresses directed according to the cords arrive at the driven support through the two cited branches, on the driven support there is a useful component for the transmission of motion.

Therefore, it is clear from the foregoing how the joint according to the invention is favorably adapted to transmit mechanical torque of any magnitude between two shafts, driving and driven shafts, using elements resistant to tensile stresses of suitable section on condition that they are flexible, or particular materials constituting the elements resistant to tensile stresses having higher and higher tension resistance, or varying the geometrical dimensions of the supports so as to increase the torque to be transmitted, increasing the lever arms of the forces directed according to the cited branches, or through any suitable combination whatsoever of all of these parameters.

The joint according to the present invention also permits one to transmit motion between non-aligned shafts.

In fact, the present invention displays the characteristic of carrying out a hinge connection (or a connection of the hinge type) between the elements resistant to tensile stresses and their relative supports.

The expression "hinge connection" or "connection of the hinge type" means a connection for which an elongated element, for instance a thread-like element, can rotate on the support in any case with respect to its point of application.

The elongated element, cord or thread, may for instance comprise a sphere inserted, in its turn, into one cavity of the support of corresponding shape.

In their turn, the flexible elements resistant to tensile stresses may be represented by metal strips, formed for instance by a plurality of cords placed side-by-side or also for instance by thin metal layers of harmonic steel (i.e., flexible spring steel) covered or not covered in their turn by cured elastomeric material.

That which is important for the purpose of the present invention is the use of a flexible material. In other words, if the metal strip is considered to be the element resistant to tensile stresses, then there will be also a connection of the hinge type for the capacity of the metal strip of bending in the same way as would a beam of thin thickness fixed in one end, but easily deformable and being of flat shape.

Therefore, in the present joint as elements resistant to tensile stresses, one may use thin layers or metal strips in which the flexibility of the material itself is such as to constitute a hinge connection or the equivalent of one.

The elements resistant to tensile stresses, whatever they are, metal or textile, may be connected to the supports with real hinge connections or with fixed-joint connections or through an adhesive or glueing operation, on condition that the thickness and the flexibility of the material are such as to permit a certain mobility to change the arrangement of the joint independently of the type of connection.

Therefore, for any solution, either wires or metal strips, since on each furthermost support the hinges are two and said hinges are aligned with respect to each other and to the center of the support forming the vertices of the edge of the two tetrahedrons, it is possible to rotate the driving support and the driven support around the axis determined by the edges of the tetrahedrons lying on said supports and also to rotate the two driving and driven supports around the axis determined by the joining edge of the two tetrahedrons lying on the intermediate support.

Preferably, the joint is characterized in comprising a spherical body encased in a hole at a central position of the intermediate support, on the two half-spheres of said body lying on opposite parts with respect to said intermediate support, and contacting central parts of the driving and driven supports.

The present invention will be still better understood from the following detailed description made by way of non-limiting example with reference to the figures of the accompanying sheets of drawings, in which.

Figure 1:
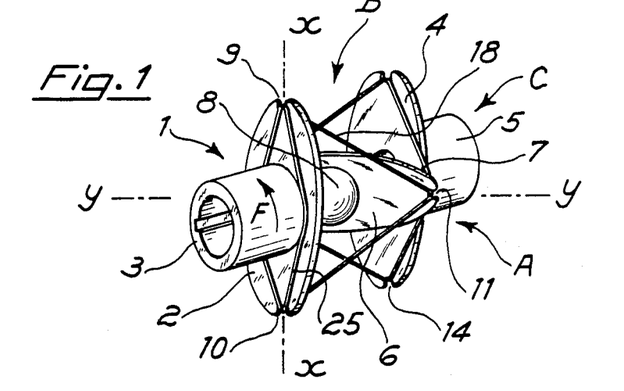
FIG. 1 is a perspective view of the joint according to the invention.

The joint 1 comprises the supporting structure and the resistant structure to transfer mechanical torque between the driving shaft and the driven shaft.

The joint 1 comprises therefore a driving support 2 having a sleeve 3 to which there is associated a driving shaft, a driven support 4 having a sleeve 5 to which there is associated the driven shaft, and an intermediate support 6. Said supports are of rigid material since the stresses to which the supports are subjected are compression stresses.

The resistant structure is constituted by flexible reinforcing elements resistant to tensile stresses.

Figure 2:
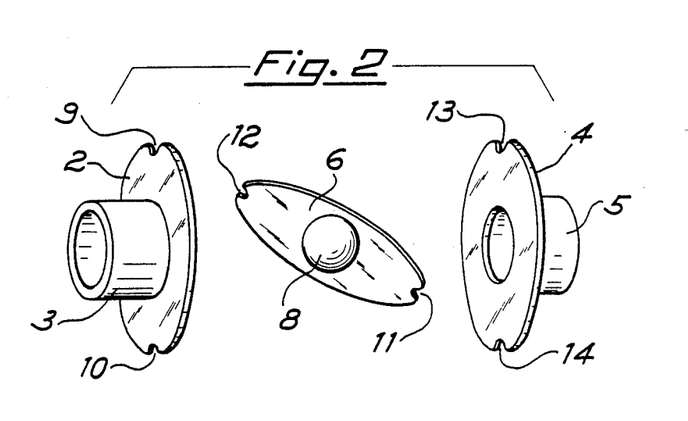
FIG. 2 is a perspective view of the furthermost and intermediate supports of the joint of FIG. 1.

The intermediate support 6 comprises means for centering the shafts, for example of the ball-articulated joint type. In one embodiment, the support 6 comprises at the center a hole in which there is encased a sphere 8 whose parts, projecting from opposite sides with respect to the support itself, abut on a central portion of the driving support 2 and of the driven support 4. The sphere 8 is of steel or of elastomeric material.

The ends of the shafts in another embodiment may be in contact with each other, and having a spherical cavity in which the spherical part of the other shaft extends.

The driving support 2 comprises two upper forks or notches 9 and lower ones 10 arranged on the same line passing through the center of the support itself.

The intermediate support 6 comprises two forks 11 and 12 aligned with respect to each other along a line passing through the center of the support.

The driven support 4 comprises two forks 13 and 14 aligned with respect to each other along a line passing through the center of the driven support itself.

The lines connecting the forks of the driving and the driven supports are parallel to one another and perpendicular to the line connecting the forks of the intermediate support.

Said flexible reinforcing elements resistant to tensile stresses can be formed by wires, metallic or textile cords, for instance cords of the wholly aromatic polyamide material known on the market as Kevlar.

In other embodiments, the flexible elements resistant to tensile stresses can be represented by wire strips or cords placed side-by-side, or metal strips.

The reinforcing elements arranged among the supports are direct, as edges of two tetrahedrons equal to each other. In other words, if one considers the two tetrahedrons of FIG. 3, it will be noted that all the sides are also illustrated in FIG. 1, as further explained hereinafter. For sake of simplicity, in FIG. 3 there has been schematically drawn the geometric shape of two tetrahedrons according to the arrangement of the flexible elements resistant to tensile stresses placed among the supports; as shown, the characteristic of the two tetrahedrons 15,16 is that of being joined together along a central edge and of having furthermost edges perpendicular to the central edge.

Figure 3:
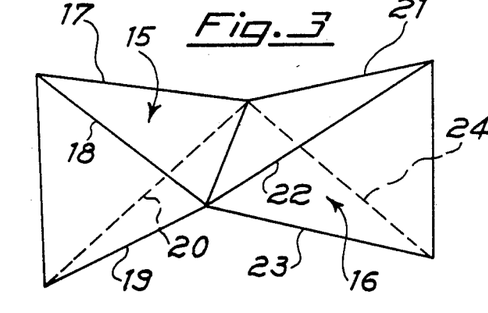
FIG. 3 shows schematically in perspective view flexible elongated elements, resistant to tensile stresses, arranged between the supports of FIG. 1.

The further edges of the tetrahedron 15 are indicated by the reference numerals 17,18,19,20, and the edges of the tetrahedron 16 by the reference numerals 21,22,23,24.

As a matter of fact, according to the construction of FIG. 1, the common or central edge and the furthermost edges of the tetrahedrons 15,16 are constituted respectively by the intermediate support 6 and by the driving and driven supports 2,4 of material resistant to compression stresses.

Figure 4:
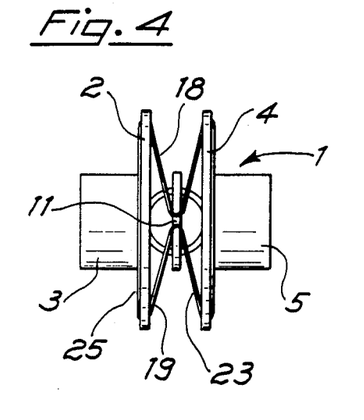
FIGS. 4 and 5 show respectively a lateral view and a top view of the device of FIG. 1 according to the directions A and B indicated in FIG. 1.
Figure 5:
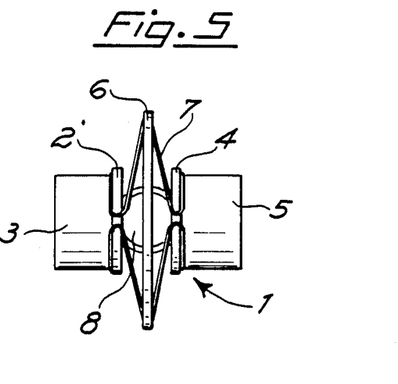

The connections between the reinforcing elements, for example a cord, and the supports are of the hinge type; in the preferred embodiment of FIG. 1, said hinge connections are obtained by passing through the forks of the supports at least one cord formed as a closed ring, as represented in FIG. 1 and in the views of FIGS. 4 and 5.

In practice, considering point 25 (FIGS. 1 and 4) as the start of the run of the cord placed on the back of the support 2, the cord passes in the order: across the upper fork 9 of the support 2, the right lateral fork 11 of the intermediate support 6, the upper fork 13 of the support 4, after which it slides along the posterior face of the support 4 in order to then pass, one after the other, through the lower fork 14 of the support 4, the right lateral fork 12 of the intermediate support 6, the lower fork 10 of the support 2, reaching thus the starting point 25 on the support 2; from this point the cord passing on the left side of the sleeve 3, as shown in FIG. 1, passes across the forks of the various supports arranged on the side opposite that now considered, the whole in the same way as just described but now omitted for sake of brevity.

At the end of the run, the second end of the cord is again on the back of the support 2 and is connected to the first end at point 25.

As shown in the arrangement of FIG. 1, the cord in its run involves the opposite forks arranged on the same central line in each support; therefore each support 2 or 4 is free to rotate around the line indicated as the axis X—X connecting the forks placed on this latter; or also each furthermost support, driving or driven, is free to transmit motion around the line connecting the opposite forks lying on the intermediate support, this latter line having been indicated in FIG. 1 as axis Y—Y.

The cords may be connected to the supports in a manner different from that just explained.

Substantially, the elongated elements are arranged according to eight edges or sides so that starting from a connection on the driving support 2 they arrive at the connection on the support 4 of the driven shaft placed on the opposite part with respect to the axis of rotation passing through the intermediate support.

The edges of the two tetrahedrons may be, as indicated, formed of cords, for instance such as those used in pneumatic tires, and therefore the invention includes the formation of the edges through a plurality of cords placed side-by-side.

The manner of winding the cords may reflect different alternatives on condition that in correspondence of the attachment of the end of each edge with the corresponding connection means on the supports, there is provided a hinge type connection or a like one and in the meantime there is produced a structure that is as flexible as possible with respect to an angle of the axes of rotation of the shafts.

The cords placed side-by-side, before being arranged to form the winding, are suitably rubberized so that, under stress, when the joint transmits mechanical torque between the driving shaft and the driven shaft, relative sliding of one cord with respect to the other will be prevented.

The joint 1 comprises pre-tensioning means 26 (FIG. 6) for the cords arranged among the supports; in a preferred embodiment, said means comprise, for each driving and driven support, a pin comprising a threaded part 27 and a furthermost part 28 shaped according to a half-spherical bowl suitable for lying on or contacting the spherical body 8.

Figure 6:
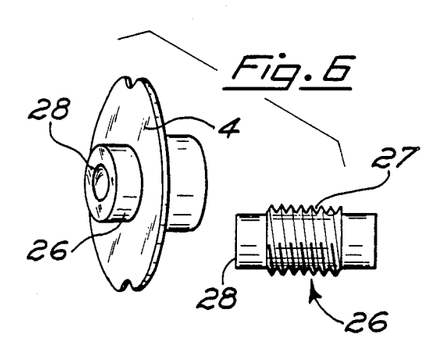
FIG. 6 shows particular pre-tensioning means of the elongated elements of the joint in FIG. 1.

When the joint 1 is provided with its own reinforcing structure, the pins 26 are introduced into the sleeves 3 and 5 threaded in their inside and screwed with a suitable tool, for instance a screwdriver introduced in a suitable notch (not shown) at the end of the pins 26 opposite the spherical bowl 28.

After screwing in the pin 26, the driving support 2 and the driven support 4, not being able to rotate because linked by the cords arranged among the supports, are moved and drawn away from the position previous to the screwing. Consequently, there is obtained a pre-tensioning of the cords arranged among the supports.

The operation of the joint for the transmission of motion between a driving shaft and a driven shaft is the following: It is considered in FIG. 3 that the consecutive edges connecting the upper end of the driving support with the lower end of the driven support and vice versa are called branches.

If one now considers a plane containing the furthermost edges, the joint is then divided into two opposite parts, each part identified by two branches, respectively 18-23 and 19-22 for a first part and 21-20 and 17-24 for the second and opposite part (FIG. 3).

When the transmission of motion takes place in the direction of the arrow F, as shown in FIG. 1, the torque of the driving shaft is transmitted to the driven support through only two branches, each belonging to the opposite parts; more precisely, through the branches 18-23 and 20-21.

Figure 3A:
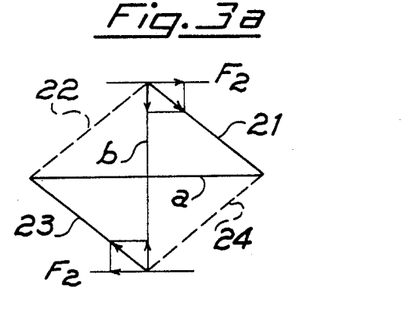
FIG. 3a shows the stresses directed toward the driven support.

By observing FIG. 3a, where through two lines a and b there have been schematized the supports 6 and 4 in a view from the back of the joint of FIG. 1 according to arrow C, and supposing for the sake of simplicity to have the two supports 6 and 4 overlapped along the two cited branches, and in particular along the edges 23 and 21, there will be stresses with components $F_2$ adapted to rotate the driven support.

The dashed edges 22 and 24 do not transmit stresses for the rotation of the driven support 4, and along the direction of the axis Y—Y the stresses along the cords passing through the forks 11,12 (FIG. 2) are such as to give on the whole only compression stresses.

In case the torque transmitted by the driving shaft has an opposite direction with respect to that indicated in the figure, the transmission of motion takes place by putting into rotation the edges forming the further two branches, i.e., those formed respectively by the edges 19,22 and the edges 24,17.

Figure 8:
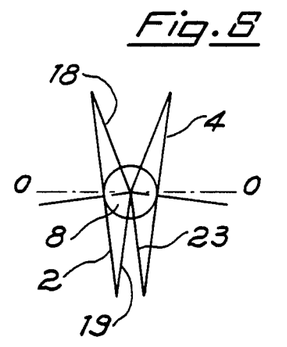
FIGS. 8 and 9 show schematically two positions of the joint shifted 90° from each other in consequence of the rotation when the driving shaft and the driven shaft are not aligned with respect to each other.

The transmission of motion between the driving shaft and the driven shaft takes place in a homokinetic (i.e., synchronous) manner in an arrangement of shafts not axially aligned with one another, as for instance as shown in FIG. 8. As shown in this figure, the driving shaft and the driven shaft form equal and opposite angles of inclination with respect to the direction of alignment O—O.

The inclination of the two shafts with respect to the direction of alignment takes place without altering the length of the edges of the two tetrahedrons; in fact, as clearly shown in FIG. 4, the inclination of the shafts is obtained by rotating, for instance, the edges 19,23 along circumferential arcs that have as the center of the circumference the fork 11 and as radius the edges 19 and 23.

Preferably, when the driving and driven shafts have an inclination with respect to the upper alignment position at certain values corresponding to angular movements, for instance at 30°, it has been found advantageous to adopt a modification of the intermediate support 6 comprising a hole at the center having dimensions greater than the diameter of the sphere 8.

Also, preferably, the sphere 8 can be disposed in central position within a bushing 29 (FIG. 7) made of an elastomeric material. In this case, the sphere 8 is kept in position by central portions of the driving and driven supports or by pins 26, as shown in FIG. 6, in contact with the surface 27 in the inside of the sleeves of the driving and driven supports through screw fastenings.

Figure 7:
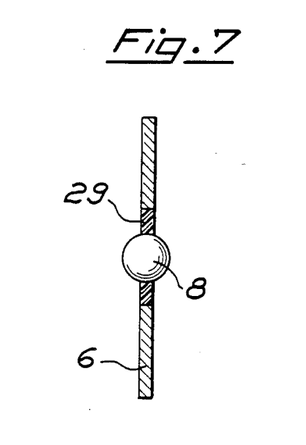
FIG. 7 shows in transversal section the intermediate support of FIG. 1 in a preferred embodiment.

The preferred arrangement of FIG. 7, or the alternative arrangement comprising a sphere encased in a hole having greater dimensions than those corresponding to its diameter, produces significant advantages relative to an improved transmission of motion and absence of any noise.

Figure 9:
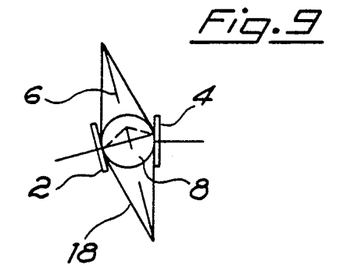

This fact can be briefly explained by considering the edge 18 in passing from the position of FIG. 8 to the position of FIG. 9.

In practice, this edge 18 connects two points belonging to two planes, the one identifying the intermediate support 6, the other identifying the driving support 2 perpendicular to the driving shaft; said planes in the non-alignment condition between the shafts are not parallel to each other.

Therefore, during the rotation of the joint the distance between said two points changes from a minimum to a maximum and an elongation of the edge in a first position of the joint and a shortening of the same edge at 180° from the first position takes place.

Since an elongation of the edges from a part of the joint and a shortening of the same from the other part, if there is permitted with the embodiment shown in FIGS. 8 and 9 the free movement of the intermediate support 6, stressing of the mechanical elements of the joint will be avoided.

Substantially, the differentiated condition of stresses with respect to the original position of the joint will tend to discharge itself on the intermediate support 6 by moving this latter in the direction of the plane in which it lies, but since the support 6 has a central hole with dimensions greater than those corrsponding to the diameter of the sphere 8, the driving and driven supports will not be subjected to stresses. This may be stated somewhat differently by saying that in relation to the center of the joint, there occurs a different state of tension in the cords. Said different tension directed against the intermediate support causes the approaching of the said intermediate support to the sphere 8 compressing, for instance, the elastomeric layer 29 but without introducing, practically, mechanical high thrusts against the sphere and therefore avoiding undue stresses on the shafts.

In fact, the intermediate support 6 stressed by the strains of the edges will tend to nullify the distance of separation from the sphere without stressing the elements linked to the sphere, i.e., the central portions of the driving and driven support together with the driving and driven shafts and the bearings of the shafts.

Of course, the variations of distance between the furthermost points of the edges on the supports are really very short, for which the preferred solution of FIG. 7 or of FIG. 9, in which the sphere 8 has dimensions smaller than the diameter of the hole in the intermediate support or is connected to the intermediate support through the elastomeric sleeve 29, constitutes a desirable improvement in those particular uses when it is desired to avoid any type of noise or of stresses on the bearings of the shafts.

In the cases where there are only small angles of inclination of the shafts with respect to their axial alignment position, the preferred way of housing the sphere in the support inside would be unnecessary so that the sphere 8 may then be housed in a central hole in the support 6 of equal dimensions.

Now there are described still further embodiments of the supporting structure and of the reinforcing elements arranged among the supports of the joint.

Figure 10:
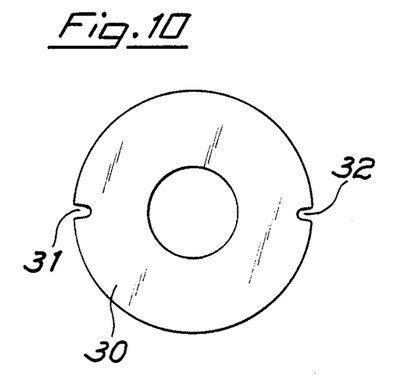
FIGS. 10 and 11 show a different embodiment of the intermediate support and of one of the furthermost supports of the joint of FIG. 1.
Figure 11:
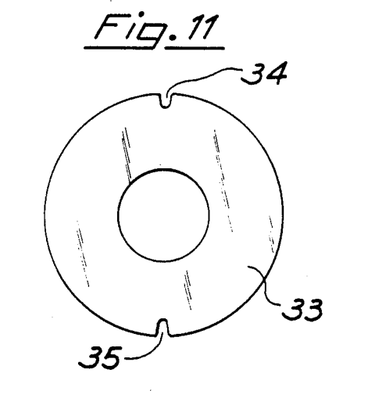

In one preferred embodiment the supports may have the shape of circular metallic flanges and in practice a circular flange 30 (FIG. 10) provided with forks 31 and 32 for the intermediate support and also circular flanges 33, such as that of FIG. 11, provided with forks 34,35 for the driving and driven shafts.

Figure 12:
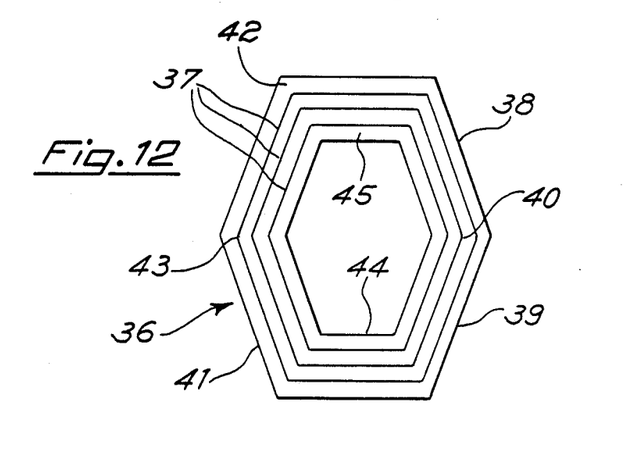
FIG. 12 shows an alternative embodiment of the elements resistant to tensile stresses arranged among the joint supports.

Also, preferably, according to a further embodiment, the reinforcing structure may comprise two parts, each part being indicated by the reference numeral 36 in FIG. 12 and comprising elongated elements 37 in the form of concentric cords embedded in a strip of elastomeric material haing a flat form with a more or less polygonal path.

In the strip of FIG. 12 two pairs of sides will be seen converging respectively, the first pair with sides 38 and 39 converging in a point 40 and the second pair with sides 41 and 42 converging in a point 43; the two pairs of converging sides are joined to each other by two cylindrical portions 44 and 45.

Figure 13:
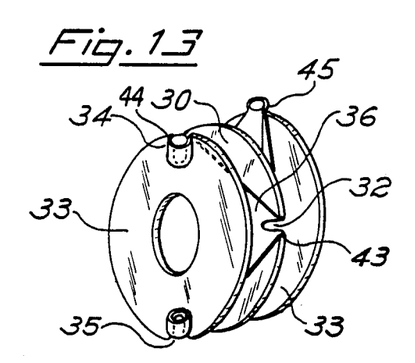
FIG. 13 shows in perspective view a joint comprising supporting elements in the embodiment of FIGS. 10, 11 and elements resistant to tensile stresses according to the embodiment of FIG. 12.
Figure 14:
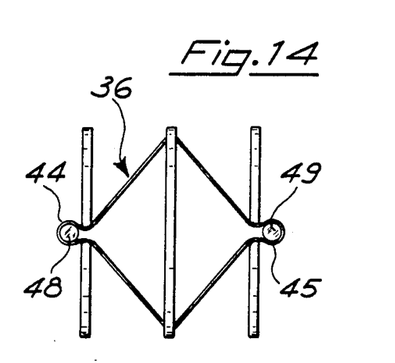
FIG. 14 is a top view of FIG. 3.

These two strips forming the reinforcing structure may be used for instance with the driving, intermediate and driven supports shown in FIGS. 10 and 11 to form the structure shown in FIG. 13.

As shown in FIG. 13, the cylindrical portions 44 and 45 of the reinforcing strip 36 are doubled together so as to form a toggle loop introduced into the upper forks 34 of the driving and driven supports 33, while the edges 40 and 43 are introduced into the forks 31,32 of the intermediate support 30.

Similar to the provision which has ben made for the upper portion of the joint of FIG. 13, a second strip of elastomeric material is introduced into the lower portion of the joint and precisely into the forks 35 of the driving and driven support and through the forks 31 and 32 of the intermediate support.

The hinge connection between strips of elastomeric material in the polygonal shape 36 of FIG. 12 with the related driving and driven supports is obtained by introducing suitable pins 48 and 48 into the toggle loops, formed by layers 44 and 45 doubled together. The pins 48 and 49 have a transverse dimension greater than that corresponding to the opening of the forks 34 and 35 of the driving support and of the driven support.

If this embodiment is compared with that of FIG. 1, there is shown the advantage of permitting one to prepare separately the connection structure and a quicker assembling with the joint supports.

Figure 15:
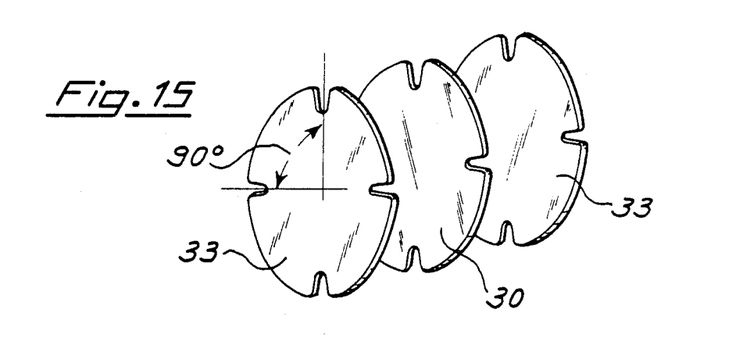
FIG. 15 shows in perspective view the position of the three supports of the joint of FIG. 13, comprising suitable means for receiving the reinforcing elements arranged among the supports according to edges of two pairs, each pair formed by or forming two tetrahedrons.

In a further embodiment the joint comprises elongated elements resistant to tensile stresses, forming at least a further pair of tetrahedrons whose edges on the driving, intermediate and driven supports are located at 90° with respect to those of the first pair of tetrahedrons, for the purpose of permitting a regular distibution of the stresses transmitted by the driving shaft to the driven shaft through the joint structure and the transfer of mechanical torques of especially high values. Thus, in the embodiment shown in FIG. 15, this arrangement comprises in particular circular metallic flanges 30 and 33 on which there are obtained pairs of forks at 90°.

Furthermore, other embodiments of the joint of this invention are those obtainable by connecting the flexible elements resistant to tensile stresses with particular connecting means arranged on the supports, if necessary in a removable manner, for instance in the form of pins screwed on the supports directed parallel to the axes of the furthermost and intermediate supports, indicated in FIG. 1 with X—X and Y—Y. More specifically, an arrangement of this type may comprise a joint (FIG. 16) formed by the driving, intermediate, and driven supports 50,51,52, respectively, on which there are arranged pairs of connecting means in the form of pins or similar elements inserted on the supports.

Figure 16:
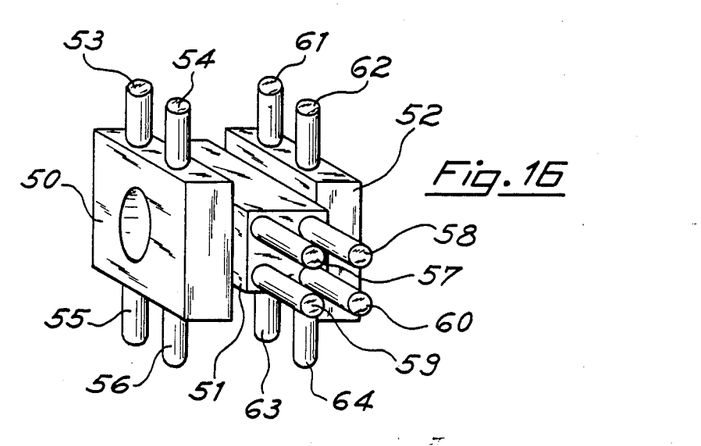
FIGS. 16, 17 and 18 show an alternative embodiment of the joint.

The driving support 50 comprises a pair of upper pins 53 and 54 and a pair of lower pins 55,56.

The intermediate support 51 comprises two pairs of upper pins 57,58 and 59,60 on each opposite part of the joint.

The driven support 52 comprises a pair of upper pins 61,62 and a pair of lower pins 63,64.

Figure 17:
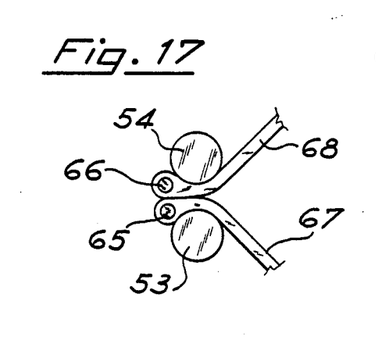
Figure 18:
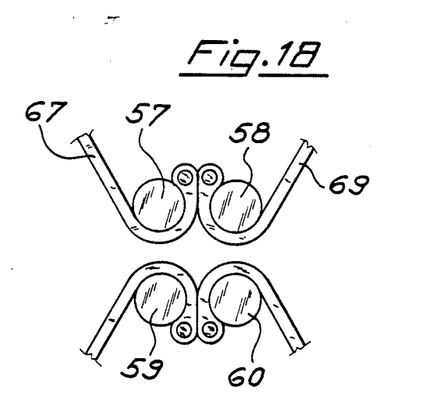

The connection of the flexible elements resistant to tensile stresses is indicated in FIGS. 17 and 18 with regard to a pair of pins 53,54 of the driving support and with regard to the two pairs of pins 57,58 and 59,60 placed on the same part of the joint of the intermediate support.

The further connections of the elements resistant to tensile stresses are similar.

As shown in FIG. 17, two elements resistant to tensile stresses, in the form of strips of tension-resistant flexible material, are maintained between the pins of the same pair, for instance by arranging cords of the type used in the manufacture of tire beads having a flipper shape around the elements represented by steel bars 65,66.

The embodiment is particularly advantageous in order to permit a high productivity of the joint.

In fact, the possibility of slipping in at least one of the pins 65,66 permits an easy assembling of flexible material strips resistant to tensile stresses that have been already premanufactured and rubberized.

In this case, the strip 67 inserted between the pins 53 and 54, together with the strip 68 at the upper end of the driving support 50, is connected between the upper pins 57 and 58 of the intermediate support 51, between which there is also connected the strip 69. In its turn the strip 69 will be connected between the upper pins of the driven support 52.

The distribution of other strips is similar.

A further embodiment, also based on the use of connections in the form of removable pins, consists in arranging on the driving and driven supports 50,52 an upper pin aligned with a lower pin and on the intermediate support 51 an upper pin and a lower pin parallel to each other, on each of the opposite parts of the joint.

The pins of the supports are directed according to the furthermost axis X—X and the two pins on the intermediate support 51 are parallel to the axis Y—Y located in FIG. 1.

Practically, the space between the two pins on each part of the intermediate support is equivalent to a fork, as indicated in the previous embodiments.

The winding of the elements resistant to tensile stresses can be carried out so as to make closed turns, within which there are introduced the pins to be screwed or fastened to the driving and driven supports.

The elements resistant to tensile stresses are again to be arranged according to eight edges and precisely with reference to the numbering of the edges of FIG. 3, the edges 18-22 forming a loop around an upper pin of the intermediate support 51 and the edges 17-21 forming a loop around an upper pin of the intermediate support arranged on the other of the said two opposite parts of the joint; the upper ends of the edges 18-17 and 21-22 comprise the turns within which there are intoduced the upper pins of the driving and driven supports 50 and 52. Likewise, there is provided the lower winding of the joint with loops of the elements formed around the further pins of the intermediate support 51.

In the two embodiments, the tension-resistant elements of the two tetrahedrons forming the joint are joined together on the intermediate support through the pins so as also to form a connection system equivalent to the joining edge represented in FIG. 3.

In fact, thanks to the flexibility of the cited elements resistant to tensile stresses having a thread-like shape or of a metal strip, in consequence of an equal inclination of the driving and driven supports with respect to a central plane identifying the intermediate support perpendicular to tensile stresses change the arc of contact with the peripheral surface of the pins conforming to the new geometrical condition assumed by the joint to transmit the desired motion between inclined shafts.

Therefore, it is evident how the joint in all the described embodiments is always apt to transmit the motion in a homokinetic manner.

Further, it is understandable how it is possible for the particular flexibility of the elements resistant to tensile stresses to bear short relative movements between the shafts caused in any way during the motion.

The joint of the present invention overcomes all the drawbacks of the previously known devices. In fact, the resistant structure of the joint adapted to transfer motion from a driving shaft to a driven shaft, as already explained, is constituted only by cords of like flexible elements in contact with the supports along very limited extension portions; therefore, by reason of the geometry of the joint, there are avoided all the wear and impact conditions between very rigid parts such as the forks and the spider of the cardan joint connected together through bushings and pins, whose coupling in time is unavoidably subjected to deterioration with consequent noise and unacceptable stresses in the transmission of motion.

Among other things it is possible, through the pretensioning means indicated in FIG. 6, to adjust the reinforcing cords bringing again, if necessary, the prestresses on the cords to the original desired values.

The joint of the present invention comprises in particular the very desirable characteristic of graduating or compensating for the torque transferred from the driving shaft to the driven shaft when said torque is subjected to sudden variations for any reason.

In fact, the reinforcing elements of the joint of the present invention may be constituted in the preferred embodiments with cords and it is possible to act on the twisting actions of said cords so as to change the characteristics of extensibility, in practice, by appropriately choosing the cords it is possible to have remaining in the ambit of the tolerable elongations of said cords a variation of torque from the driving shaft to the driven shaft and thus to graduate said torque very favorably without stressing the devices of the transmission.

Further, thanks to the characteristic of flexibility of the elements resistant to tensile stresses in the joint of the present invention, it is possible to obtain short relative axial movements and short relative movements between driving shaft and driven shaft.

The joint or coupling of the present invention moreover provides further advantages with regard to the known resilient joints or couplings, since after numerous work cycles the resistant structure of the joint formed by cords or similar reinforcing elements does not suffer substantial variations in the regularity of the transmission of motion, as is true in some cases in resilient joints of the prior art in which the elastomeric material suffers modulus variations in consequence of heating.

It has been found also that the joint of the present invention results in improved conditions in the transmission between inclined shafts with respect to their alignment position, up to values of inclination of the shaft substantially higher than those at present possible in known applications.

Therefore, the joint of the present invention not only satisfies all the conditions comprised in the definition of a resilient joint, but significant advantages with respect to the known joints and, further, may in a certain sense be considered to be mechanically equivalant to a double cardan joint joined to a resilient joint, the whole having improved conditions for the transmission of motion and at the same time with considerable advantages as regards the simplicity and cost. Although certain embodiments of the invention that are particularly advantageous have been described, it is understood that the invention includes within its scope any other alternative embodiment deriving from the above-indicated inventive principle; for instance, the reinforcing cords suitable for particular applications, in which there is required a determined resilience of the joint can be realized with lang lay cords or with nylon cords or of like materials.

Moreover, the reinforcing cords or the reinforcing elements resistant to tensile stresses connecting the various supports may be suitably protected through their insertion into a suitable elastomeric envelope.

Also, the present invention includes embodiments in which the joint operates without centering means between the shafts; in this case the distance between the supports is determined by the connection position of the shafts in the relative housing seats. Said centering means may be of high deformability, elastomeric or metallic, as for instance steel springs or rubber plugs.

What is claimed is:

1. A joint for transmission of motion from a driving shaft to a driven shaft, comprising: (a) a driving support connected to the driving shaft, (b) a driven support connected to the driven shaft, (c) an intermediate support placed between said driving and driven supports, an axis of said driving support and an axis of said driven support lying on a plane which is perpendicular to an axis of said intermediate support, (d) flexible elements resistant to tensile stresses for relative coupling between said intermediate support and said driving and driven supports, said flexible elements comprising a first flexible element extending from one end of said driving support located on said axis of said driving support to an end of said intermediate support located on said axis of said intermediate support and a second flexible element extending from an end of said driven support located on said axis of said driven support to another end of said intermediate support, said end of said driven support being located opposite to said end of said driving support and said another end of said intermediate support being opposite to said end of said intermediate support, said first and second flexible elements being connected to said ends of said supports through hinge-type connections, and (e) centering means located in central position of said intermediate support and having portions lying on opposite parts with respect to said intermediate support, and pressing on said central parts of the driving and driven supports, said intermediate support being freely movable relative to said shafts when said shafts are disposed in non-aligned relationship.

2. A joint as defined in claim 1, wherein said centering means comprises a spherical body disposed in a hole in a central position of said intermediate support.

3. A joint as defined in claim 2, characterized in that the hole of said intermediate support has dimensions greater that those corresponding to the diameter of said spherical body.

4. A joint as defined in claim 1, characterized in that said supports are constituted by circularly-shaped metallic flanges.

5. A joint as defined in claim 1, characterized in comprising means for putting into pre-tensioning condition said flexible elements resistant to tensile stresses.

6. A joint as defined in claim 1, characterized in that said flexible elements resistant to tensile stresses are rubberized cords.

7. A joint as defined in claim 1, characterized in having an elastomeric covering which at least partially covers said joint.

8. A joint as defined in claim 1, characterized in that said centering means includes a sphere, said joint further comprising a bushing of elastomeric material disposed in central position of said intermediate support, said bushing being provided with a central hole in which said sphere is encased for centering the driving and driven supports.

9. A joint as defined in claim 1, wherein said flexible elements between said supports are arranged respectively such that said flexible elements are oriented to form first and second tetrahedrons joined together along a common edge formed by said intermediate support, furthermost flexible elements which form edges of said tetrahedrons are associated with the driving and driven support, ends of the flexible elements which form edges of the tetrahedrons are connected on said supports through a hinge-type connection, and said furthermost flexible elements are parallel to one another and lie on a plane perpendicular to said edge formed by said intermediate support.

10. A joint as defined in claim 9 characterized in that said flexible elements form at least a further second pair of tetrahedrons whose edges on said supports are at an angle of 90° with respect to those of the first pair of tetrahedrons.

11. A joint as defined in claim 1, further comprising a body encased in a hole in a central position of said intermediate support, said body having parts projecting from opposite sides relative to said support, said parts abutting central portions of the driving and driven supports respectively, dimensions of said hole being greater than dimensions of said body.

12. A joint as defined in claim 13, wherein said body is a sphere.

13. A joint as defined in claim 1, characterized in that each of said supports comprises on the same face at an equal distance from the respective center and along the same direction, a pair of forks provided with openings arranged on said face, said forks being crossed by at least a flexible elements resistant to tensile stresses forming two tetrahedrons joined together along one edge constituted by said intermediate support, said flexible element having a closed ring configuration.

* * * * *